United States Patent Office 3,441,644
Patented Apr. 29, 1969

3,441,644
POST CURE METHOD FOR WIRE REINFORCED
RUBBER HOSE
Charles E. Grawey, Peoria, Ill., assignor to Caterpillar
Tractor Co., Peoria, Ill., a corporation of California
No Drawing. Filed Feb. 27, 1967, Ser. No. 619,040
Int. Cl. B29c 25/00
U.S. Cl. 264—346    3 Claims

ABSTRACT OF THE DISCLOSURE

A high pressure wire reinforced rubber hose carcass usually consists of a rubber core on which are wound several plies of reinforcing wires in a spiral pattern, each ply being separated by a layer of rubber. Normally, when the carcass is fabricated the rubbers (elastomers) are in an uncured state and subsequent to wrapping the carcass within an outer scuff cover of rubber it is vulcanized as a unit. During vulcanization of the carcass, atomic hydrogen is liberated within the wall structure of the hose which apparently accumulates on, and diffuses into the reinforcing wires causing hydrogen embrittlement of these wires. It has been found that the service life of the hose can be manifestly improved by a thermal post cure of the vulcanized hose to reduce the quantity of atomic hydrogen within the wall structure of the hose thereby reducing hydrogen embrittlement of the reinforcing wires. In practice, shortly after vulcanization is completed, the finished hose is post cured by annealing it at temperatures from 200° F. to 350° F. for at least 15 hours.

Background of the invention

High pressure, wire reinforced hose is usually fabricated by supporting an uncured extruded rubber core on a mandrel, providing the core with a protective fabric shroud and then wrapping the core with plies of stiff, resilient steel wires in a spiral pattern. The cylindrical wire plies have a thickness equal to the diameter of the individual wire, and are separated by a thin layer of uncured rubber. Often the reinforcing wires in the plies will be cold worked through dies to give them a helical "set" approximating their lay within the finished hose carcass. U.S. Patent No. 3,037,343 issued to Haas et al. more fully describes the fabrication of high pressure, wire reinforced rubber hose with construction techniques alluded to above.

After the desired number of wire plies have been wound upon the hose carcass, the outermost ply is wrapped with an uncured rubber scuff cover. Subsequently the carcass is wrapped with nylon shrink tape or a lead wrap and then is vulcanized while still supported by the mandrel.

During vulcanization it was found that atomic hydrogen is liberated which apparently accumulates on the surfaces and diffuses into the steel reinforcing wires which are often brass plated to improved their adhesion to the rubbers. Since the carcass is encased in shrink tape or a lead wrap and supported by the mandrel during vulcanization, atomic hydrogen removal is restricted even though the temperature is elevated for vulcanization. Therefore, mere extension of the vulcanizing time will not remove a significant amount of the atomic hydrogen.

Accumulation of the atomic hydrogen on the surfaces and diffusion into the reinforcing wires causes them to become brittle. Since in hydraulic circuits the wires in the hose will be subjected to some flexure due to the pressure rise and drop in the circuit, embrittlement will eventually lead to the failure of the reinforcing wires and subsequent failure of the hose. From a careful investigation of the reinforcing wires in hoses which had failed, it was determined that these wires had brittle fractures which occurred in a plane normal to the wire's helix, and thus were not attributable to poor tensile properties of the reinforcing wires. In fact, tests demonstrated that the tensile properties of the reinforcing wires were still satisfactory.

Because the existence of the brittle fractures is characteristic of hydrogen embrittlement of steels, a further investigation was undertaken. It was determined that cold working of steels, such as the putting of the helical set in the reinforcing wires, increased solubility of atomic hydrogen in steels. Also, it was found that cathodic poisons, such as acids and sulfur, usually present in reclaimed rubber, tend to delay the recombination of atomic hydrogen and increase its residence time in the wall structure of the hose. Further the more-or-less impermeable coatings, such as the brass plating on reinforcing wires, makes the elimination of atomic hydrogen from these reinforcing wires more difficult.

Thus, it was determined that hydrogen embrittlement of the reinforcing wires was a previously unidentified problem in wire reinforced hose which was causing premature failures.

Summary

Having identified the hydrogen embrittlement problem in wire reinforced hose, an annealing process for post curing the hose was developed. This post curing method involves annealing the vulcanized hose after it has been stripped of the shrink tape or lead wrap and removed from the mandrel at a temperature from 200° to 350° for a period sufficient to substantially reduce the quantity of atomic hydrogen in the wall structure of the finished hose. Generally there is a temperature/time correlation, with the lower temperatures requiring the longer annealing periods.

Description

Generally it is believed that the rate at which hydrogen is removed from steels is higher at higher temperatures. For example, hydrogen removal is 250 to 500 times faster at 400° F. than at room temperatures, but because of the increased solubility of hydrogen within increasing temperature the optimum temperature for hydrogen removal seems to be in the range of 300° to 400°, especially when working with electroplated steels. However, in the case of the wire reinforced hose, a lower range of temperatures is necessary in order to preserve the integrity of the rubber structures in the hose. Therefore, the upper limit within which the present process may be practiced is about 350° F. At a temperature of 150° F. the annealing process is too long for a practical process, and therefore a temperature range between 200° and 300° is more realistic. In general, the preferred practice of the invention involves an annealing temperature between 250° to 300° for at least 15 hours, and preferably around 24 hours. It was established that excellent results could be achieved with a post cure temperature of 250° F. for a period of about 24 hours.

The following example will serve to illustrate the value of the present post cure method:

Commercially available wire reinforced hose was obtained which had a history of failure and was divided into four equal lengths of approximately three feet each. Two of these lengths of hose were post cured at a temperature of 250° for 150 hours, while the other two lengths served as standards. All the lengths were thereafter installed into a test apparatus which was designed to test the endurance of the hose. This apparatus subjected the hose lengths to a cycling oil pressure from zero to 4,000 p.s.i. at 200° C., repeatedly until the hose failed, or the test was stopped. In the instant test, the two lengths of hose which were post cured according to the present invention accumulated 1.2 million cycles without a failure. The two standard lengths which were not post cured according to this invention, both burst after approximately 100,000 cycles.

The atmosphere around the hoses which were post cured according to this invention was analyzed and revealed the presence of hydrogen sulfide, sulfur dioxide and carbon dioxide tending to substantiate the effectiveness of the annealing process in removing atomic hydrogen.

A series of subsequent tests verified the above results and demonstrated the service life of the hose was improved at least ten times in every case.

After the initial test described above was completed, it was determined that the annealing process could be satisfactorily accomplished in wire reinforced hose at a temperature of 250° for a period of 24 hours.

In general it is believed that the hydrogen embrittlement problem is more severe when reclaimed rubber is used in manufacture of wire reinforced hose due to the presence of acids plus a high sulfur content. These elements tend to increase the presence of atomic hydrogen in the wall structure and cause more severe hydrogen embittlement of the reinforcing wires which can cause early failure of the hose.

During investigations of the above problems in improving the quality of wire reinforced rubber hose some investigators doubted that hydrogen embrittlement was the reason for the brittle wire fractures. However, there was a consensus of agreement that the characteristics of the fracture and its elimination by the annealing process behaved as though hydrogen embrittlement actually was the cause. In view of this disagreement there is no intention to limit the invention in this respect, and it is only alleged that the annealing technique manifestly improves the quality of wire reinforced hose.

In general, if hydrogen embrittlement is indeed the cause of hose failure, it is suspected that the hydrogen atoms may be formed both during the vulcanization and also thereafter when the hose is employed at high service temperatures under actual operating conditions. Through the use of the annealing post-cure process, the chemical reactions occurring within the hose which produce the hydrogen atoms are driven to completion prior to the time that the hose is subjected to high pressures and temperatures (stress) under actual service condition. In any case, the greatly improved quality of the hose seems to support this contention.

Also, since the annealing process is completed prior to the attachment of hose couplings, it provides collateral advantages along with lessening hydrogen embrittlement of the wires. Normally, wire reinforced hose will undergo a normal shrinkage during its service life which often results in a loss in stress in the rubber liner contiguous to the coupling assembly, leading to leakage and blowoff. Since the annealing process "ages" the hose rapidly (extracting the plasticizer), the normal shrinkage will be accomplished prior to the time the coupling is attached to the hose. This allows a better connection between the hose and coupling and also lessens the stress relaxation of the rubbers contiguous to the coupling as the hose grows older, thereby lessening the chance of leakage and blowoff. Further, it is believed that the annealing technique drives the chemical reaction occurring during vulcanization toward a higher cross-link density thereby lessening the stress relaxation in the rubbers as the hose ages. This increase in cross-link densities occurring prior to the attachment of the coupling also tends to eliminate leakage and blowoff.

Having described my invention, I claim:

1. A post cure method for treating high pressure, steel wire reinforcing hose compring annealing vulcanized wire reinforced rubber hose subsequent to the removal of its mandrel and outer wrap used during vulcanizing at a temperature from 200° F. to 350° F. to remove atomic hydrogen in the wall structure of said hose and age the hose.

2. The post cure method as defined in claim 1 wherein the vulcanized hose is annealed for at least 15 hours.

3. The post cure method as defined in claim 1 wherein the annealing temperature is between 250° F. and 300° F. and the hose is annealed for at least 15 hours.

References Cited

UNITED STATES PATENTS

| | | | |
|---|---|---|---|
| 2,525,662 | 10/1950 | Freeman | 264—347 |
| 3,255,284 | 6/1966 | Meislohn | 264—236 |

JULIUS FROME, *Primary Examiner.*

A. H. KOECKERT, *Assistant Examiner.*

U.S. Cl. X.R.

264—347

U.S. DEPARTMENT OF COMMERCE

PATENT OFFICE

Washington, D.C. 20231

UNITED STATES PATENT OFFICE
CERTIFICATE OF CORRECTION

Patent No. 3,441,644            April 29, 1969

Charles E. Grawey

It is certified that error appears in the above identified patent and that said Letters Patent are hereby corrected as shown below:

Column 2, line 72, "200° C." should read -- 200° F. --. Column 4, line 26, "reinforcing hose compring" should read -- reinforced hose comprising --.

Signed and sealed this 21st day of April 1970.

(SEAL)
Attest:

Edward M. Fletcher, Jr.          WILLIAM E. SCHUYLER, JR.

Attesting Officer                 Commissioner of Patents